Feb. 15, 1944.  I. J. DRESCH  2,341,604
BASE BLANK FOR DENTURES
Filed April 17, 1942
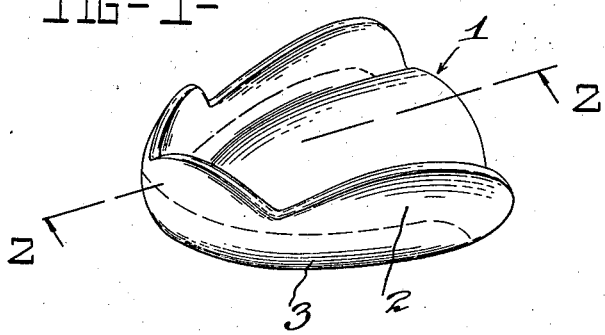
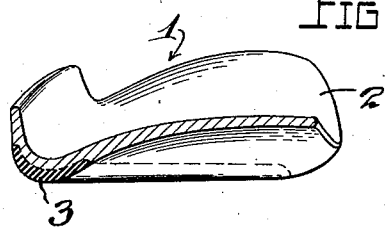
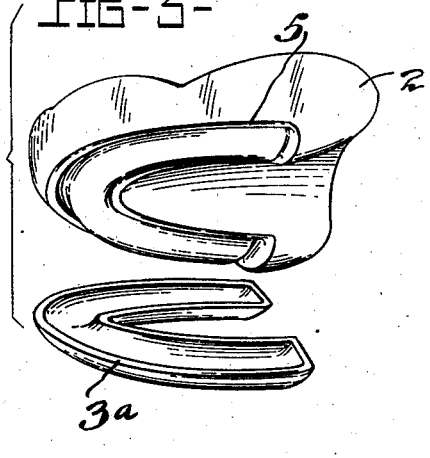
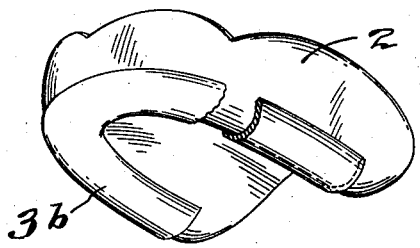
Inventor
ISRAEL J. DRESCH
By Owen & Owen
Attorneys Patented Feb. 15, 1944

2,341,604

UNITED STATES PATENT OFFICE 2,341,604

BASE BLANK FOR DENTURES

Israel John Dresch, Toledo, Ohio, assignor to The Dresch Laboratories Company, Toledo, Ohio, a corporation of Ohio Application April 17, 1942, Serial No. 439,379

6 Claims. (Cl. 32—2)

This invention relates to the making of dentures, and particularly to a denture base blank made of polystyrene resin, and has for its object the provision of such a blank having certain important novel features and characteristics.

It is known that polystyrene resin is particularly desirable for use as a denture material and that when formed by "compression" molding, as has been the practice, it has not been uniformly successful because of lack of strength and flexibility so essential to dentures. It is found, however, that these properties of strength and flexibility are obtained in articles formed from polystyrene resin if the forming is by the "injection" molding method. Inasmuch as it is necessary, however, to use pressures of from 10,000 to 30,000 pounds in the molding of polystyrene by the injection method, such method is not practical for use in the making of dentures, as the plaster molds necessary for denture molding cannot withstand these pressures. Furthermore, the varied distribution of the plastic in different dentures, and the absence of a polished mold, would, if made by the injection method, require even a higher pressure for satisfactory denture molding than for general industrial molding.

In the "compression" molding of a plastic such as polystyrene, the plastic powder or granules are interposed between the two parts of a heated mold and pressure is applied as the mold is closed. The combination of temperature and pressure causes the grains of plastic to "wet" or moisten and to be sealed to adjacent grains and in this way the grains are united into a whole or solid which assumes the shape of the mold cavity.

In "injection" molding, polystyrene is first heated in the container and pressure then applied to force it through a sprue into the mold cavity. The pressure employed at the required temperature causes the plastic to "wet," and the movement or flow of the plastic to the mold cavity through the sprue causes the plastic grains to rub one against the other, and it is thought that it is this action, together with the high pressures, that forms a strong and uniform union between the grains of the plastic and imparts to the molded object the strength and flexibility desired in a denture.

The average denture is irregular both in shape and in distribution of bulk and nearly every denture has relatively thin areas separated by relatively thick areas. To make such objects by injection molding, even with metal molds, as in the industrial field, requires testing and modification of molds—a trial or error beginning. In denture work, the first molding must be satisfactory, for in the use of a plaster mold, the mold itself is destroyed by the temperature, the pressure and the removal of the molded object, and therefore additional molding of the same denture would require a fresh start from the beginning, including a new impression of the patient's jaw and all subsequent work in the preparation of the mold.

In injection molding, as used industrially, the metal molds are usually highly polished, often being chromium-plated, to facilitate the flow of the material. In the use of plaster molds, however, such smooth surfaces are not present and prohibitive loads result due to the tendency of the plastic to adhere to the plaster walls. Attempts have been made to remedy this condition by lining plaster molds with tinfoil, but without success, as the pressure and flow of the plastic tends to move the tinfoil from position.

In a copending application Serial No. 418,470, filed November 10, 1941, and entitled "Artificial denture," I have pointed out the advantage, in a denture having a polystyrene resin base, of combining acrylic resin therewith in the area of and in contact with the teeth to prevent the detrimental checking of the polystyrene material around the teeth, which occurs when such material alone is used. In that application, the polystyrene and acrylic resins were described as being introduced in the plaster denture hold in powder form and then rendered into a homogeneous plastic by the application of heat and pressure, with the acrylic plastic providing a spacing medium between the polystyrene plastic and teeth.

In the accompanying drawing, Fig. 1 is a perspective view of a blank embodying the invention; Fig. 2 is a cross-section thereof on the line 2—2 in Fig. 1; Fig. 3 is a perspective view of a modified form of the blank, and in which the tooth engaging layer or insert, shown separated therefrom, is intended to seat in a surface recess in the occlusal portion of the blank, and Fig. 4 shows another form of the invention with a layer of tooth engaging material applied to the blank base and partly broken away.

Referring to the drawing, I designates a denture blank comprising a base or body part 2 of polystyrene resin having a layer or insert 3 of acrylic resin, or other suitable thermoplastic having an affinity to the base material, disposed in the tooth attaching area of the blank, whereby the teeth when attached are separated from the base material by that of the layer or insert 3.

The blank 1 is given the general shape and appearance of a denture, except that it does not have the teeth attached, and is slightly heavier and larger than the denture for which intended. The blanks may be made and supplied in several sizes and forms for both upper and lower jaws to be used by dentists or others in the making of dentures.

The polystyrene base portion 2 of each blank, in order to give it the strength and flexibility necessary for practical use in dentures, is made by the injection molding method preferably at a temperature between 300° and 500° F., and at a pressure between 10,000 and 30,000 pounds per square inch. The layer or insert 3 may be separately formed by either compression or injection molding and placed in proper position in the mold for uniting with the injected polystyrene plastic. During this uniting action, the layer or insert material 3 is heated to effect a sufficient softening thereof for the two materials to join in an integral homogeneous manner and to conform to the shape of the mold. The two plastics may, of course, be colored in advance, as well understood in the art, to simulate the color of the gums.

The layer or insert 3 is of horseshoe shape to conform to the teeth arrangement of a denture and is preferably about one-sixteenth of an inch thick and three-quarters of an inch wide, so as to cover the occlusal area of a denture to which the teeth are to be attached.

It is apparent that the finished blank embodying my invention not only includes a base or body portion of polystyrene resin molded in a manner and under a pressure of from ten to thirty thousand pounds, preferably about the latter, to impart to it the strength and flexibility so essential to dentures, but also has a coating of acrylic or other suitable tooth contacting resin over the entire area of the blank which has contact with the porcelain teeth when the blank is later made into a denture. The provision of this coating saves the user the time and trouble of positioning a layer of such tooth contacting resin over the teeth before placing the polystyrene blank in a mold preparatory to molding, as would otherwise be required. It also assures that the acrylic or other suitable resin will be properly condensed, and also properly distributed for the purpose intended. It will, of course, be understood that the temperature and pressures employed in the molding of the blank, as well as the affinity of the two plastics, causes them to unite closely and intimately to form an integral and homogeneous whole.

In practice, the tooth engaging portion 3 of the blank is preferably separately formed and then integrally united with the blank in the blank forming mold as above described. If desired, however, the portion 3 may be attached to the base portion 2 of the blank by cementing or in any other suitable manner, so that the parts 2 and 3 are not integrally joined or welded together until subjected to the heat and pressure in the plaster mold wherein the blank is attached to the teeth and given proper shape for the desired denture. It is preferable, however, to integrally join the portions 2 and 3 of the blank when the blank is initially molded, as this provides a better and closer union between the two parts because of the far higher pressure which can be employed and of the fact that the polystyrene has a better "wetting" condition under the higher initial molding pressures and temperatures. Furthermore, by this preferred method the tooth engaging part 3 is automatically positioned in the most ideal relationship with the polystyrene base so that the portion 3 will be in the occlusal area and in the best position for receiving the porcelain teeth. In Fig. 3 the blank part 2 is provided in its occlusal area with a recess 5 in which the tooth engaging portion 3a may be received and held by cementing with a suitable heat softening cement, or in any other suitable manner, as by friction. Or the occlusal area of the base may be faced with a separate layer 3b (Fig. 4) of the tooth engaging material, held thereto in any suitable manner, so that it will be shaped and integrally united to the polystyrene base under the denture molding action.

The user of the blank prepares the plaster mold for the desired denture in the same general manner as for the use of rubber or other plastics used for denture molding. For instance, this may be done by making a wax pattern of a proposed denture with the porcelain teeth imbedded therein, and then placing this pattern in a separable mold-making denture flask which is filled with plaster in such manner as to permit the separation of the flask for the removal of the wax pattern and for the introduction of the synthetic plastic, or in the present instance the denture blank.

A blank 1 suitable in shape for the particular denture being made, and slightly larger, is then placed in the plaster mold, which is then assembled and placed in a hot press, or oven, or immersed in a hot liquid, as desired, until the temperature softens the material of the blank, after which the mold is closed by means of a press, such as is commonly used in dental laboratories. It is found that satisfactory results can be obtained by a temperature of between 300° and 375° F. The closing pressure of the mold is only required to be sufficient for the proper adaptation and shaping of the blank material to the plaster mold, and hence may be relatively low and well within the ability of the plaster investment of the mold to withstand without injurious deformation. During this action, the teeth, which are attached to the plaster mold, have their roots imbedded in the portion of the blank which is covered by the layer or insert portion 3, so that the teeth are separated from the polystyrene material by such portion. It is found that the final softening and shaping pressure imparted to the blank does not materially modify or affect the qualities of strength and flexibility obtained in the initial high pressure forming of the blank, so that the finished denture has these important qualities.

While I have particularly referred to joining a strip of acrylic plastic to a polystyrene denture blank, it is apparent that a strip or insert of any other compatible plastic suitable for the purpose may be joined with that area of the blank which makes contact with the porcelain teeth of the denture.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. As a new article, a denture blank comprising a base of polystyrene resin, molded under a pressure of from ten to thirty thousand pounds, having a tooth attaching layer of acrylic resin.

2. As a new article, a denture blank comprising a base of polystyrene resin, molded under a pressure of from ten to thirty thousand pounds, having an integrally united layer of acrylic resin in the tooth attaching area thereof whereby the teeth when attached in the making of a denture are separated by the acrylic resin from the polystyrene resin and the teeth are separated from each other by said acrylic resin.

3. As a new article, a denture blank comprising a base of polystyrene resin, molded under a pressure of from ten to thirty thousand pounds, having an integrally united layer of acrylic resin in the tooth attaching area thereof whereby the teeth when attached in the making of a denture are separated by the acrylic resin from the polystyrene resin, said layer being approximately one-sixteenth of an inch thick and three-quarters of an inch wide.

4. As an article, a denture blank of a shape and size generally conforming to a denture body to which teeth are to be attached, said blank comprising a base or body part of polystyrene resin molded under a pressure of from ten to thirty thousand pounds and a tooth attaching area portion of a thermoplastic material different from and having an affinity to said base material and attached thereto whereby teeth when attached to the blank are separated from the polystyrene material by said other material at least at the surface portion of the blank from which they protrude.

5. As a new article, a denture blank of a shape and size generally conforming to a denture body to which teeth are to be attached, said blank including a base of polystyrene resin molded in the presence of heat from 300° to 500° F. under a pressure of between approximately 10,000 and 30,000 pounds.

6. As a new article of manufacture, a denture blank of a shape and size generally conforming to a denture body to which teeth are to be attached, said blank including an injection molded base of polystyrene resin, molded under a pressure of from ten to thirty thousand pounds, and an occlusal surface portion carried by said base and being of a different thermoplastic material which has an affinity to the base material whereby the two are integrally united under the heat and pressure applied by a plaster denture mold.

ISRAEL JOHN DRESCH.